(12) United States Patent
Kobayashi (10) Patent No.: US 7,187,309 B2
(45) Date of Patent: Mar. 6, 2007

(54) ANGLE COMPUTATION METHOD AND APPARATUS FOR VARIABLE RELUCTANCE RESOLVER

(75) Inventor: Masahiro Kobayashi, Tokyo (JP)

(73) Assignee: Minebea Co., Ltd., Nagano-ken (JP)

(*) Notice: Subject to any disclaimer, the term of this patent is extended or adjusted under 35 U.S.C. 154(b) by 466 days.

(21) Appl. No.: 10/866,804

(22) Filed: Jun. 15, 2004

(65) Prior Publication Data

US 2005/0132802 A1 Jun. 23, 2005

(30) Foreign Application Priority Data

Dec. 22, 2003 (JP) ............................. 2003-424204
Apr. 14, 2004 (JP) ............................. 2004-118722

(51) Int. Cl.
*H03M 7/00* (2006.01)
(52) U.S. Cl. ........................... 341/116; 341/117
(58) Field of Classification Search ................ 341/116, 341/117; 73/862.191, 514.31; 701/41; 600/424
See application file for complete search history.

(56) References Cited

U.S. PATENT DOCUMENTS

| 5,645,065 | A * | 7/1997 | Shapiro et al. ............. 600/424 |
| 6,885,927 | B2 * | 4/2005 | Arimura ....................... 701/41 |
| 2003/0200018 | A1 * | 10/2003 | Arimura ....................... 701/41 |
| 2005/0061087 | A1 * | 3/2005 | Kichise et al. ......... 73/862.191 |

FOREIGN PATENT DOCUMENTS

JP 11-51692 2/1999

* cited by examiner

*Primary Examiner*—Rexford Barnie
*Assistant Examiner*—Joseph Lauture
(74) *Attorney, Agent, or Firm*—Bacon & Thomas, PLLC (57) ABSTRACT

In an angle computation method and apparatus for a variable reluctance resolver, the maximum values $V_{sin}(\max)$ and $V_{cos}(\max)$ of sine and cosine output voltages in respective positive value ranges and the minimum values $V_{sin}(\min)$ and $V_{cos}(\min)$ of the sine and cosine output voltages in respective negative value ranges are extracted, and on the basis of these values, offset values, amplitude values, sin-cos voltage ratio, and a zero-point correction value are obtained in accordance with the following equations:

$$V_{SINOFFSET}=(V_{sin}(\max)+V_{sin}(\min))/2$$

$$V_{SINAMP}=(V_{sin}(\max)-V_{sin}(\min))/2$$

$$\theta_{SINPHASE}=\sin^{-1}(V_{SINOFFSET}/V_{SINAMP})\cong V_{SINOFFSET}/V_{SINAMP}$$

$$V_{COSOFFSET}=(V_{cos}(\max)+V_{cos}(\min))/2$$

$$V_{COSAMP}=(V_{cos}(\max)-V_{cos}(\min))/2$$

$$K=V_{SINAMP}/V_{COSAMP}$$

On the basis of the thus-obtained values, an angle θ is obtained in accordance with the following equation:

$$F(V_{sin}-V_{SINOFFSET}, K(V_{cos}-V_{COSOFFSET}), \theta_{SINPHASE})=\theta.$$

6 Claims, 6 Drawing Sheets

| ANGLE RANGE AND CALCULATED ANGLE($\theta'$) | $\sin\theta$ | $V_{\sin}(=B\sin\theta)$ | $V_{\sin}-V_{\mathrm{SINOFFSET}}$ | $\theta_{\mathrm{SINPHASE}}(\theta_s)$ | $\cos\theta$ | $V_{\cos}(=D\cos\theta)$ | $V_{\cos}-V_{\mathrm{COSOFFSET}}$ | $K(V_{\cos}-V_{\mathrm{COSOFFSET}})$ |
|---|---|---|---|---|---|---|---|---|
| 0° | 0 | · | · | · | 1 | · | · | · |
| · | · | · | · | · | · | · | · | · |
| 90° | 1 | · | · | · | 0 | · | · | · |

FIG.6(c)

| ANGLE RANGE AND CALCULATED ANGLE($\theta'$) | $\sin\theta$ | $V_{\sin}(=B\sin\theta)$ | $V_{\sin}-V_{\mathrm{SINOFFSET}}$ | $\theta_{\mathrm{SINPHASE}}(\theta_s)$ | $\cos\theta$ | $V_{\cos}=D\cos\theta$ | $V_{\cos}-V_{\mathrm{COSOFFSET}}$ | $K(V_{\cos}-V_{\mathrm{COSOFFSET}})$ |
|---|---|---|---|---|---|---|---|---|
| 0° | | | | | | | | |
| $\theta'=\theta+\theta_s$ | ↓ | ↓ | ↓ | ↓ | | | | ↓ |
| 45° | | | | | | | | |
| $\theta'=(90°-\theta)+\theta_s$ | ↓ | ↓ | ↓ | ↓ | | ←(ABSOLUTE VALUE) | ←(ABSOLUTE VALUE) | ←(ABSOLUTE VALUE) |
| 90° | | | | | | | | |
| $\theta'=(90°+\theta)+\theta_s$ | ↓ | ↓ | ↓ | ↓ | | ←(ABSOLUTE VALUE) | ←(ABSOLUTE VALUE) | ←(ABSOLUTE VALUE) |
| 135° | | | | | | | | |
| $\theta'=(180°-\theta)+\theta_s$ | ↓ | ←(ABSOLUTE VALUE) | ←(ABSOLUTE VALUE) | ↓ | | | | |
| 180° | | | | | | | | |
| $\theta'=(180°+\theta)+\theta_s$ | ↓ | ←(ABSOLUTE VALUE) | ←(ABSOLUTE VALUE) | ↓ | | | | |
| 225° | | | | | | | | |
| $\theta'=(270°-\theta)+\theta_s$ | ↓ | ↓ | ↓ | ↓ | | ←(ABSOLUTE VALUE) | ←(ABSOLUTE VALUE) | ←(ABSOLUTE VALUE) |
| 270° | | | | | | | | |
| $\theta'=(270°+\theta)+\theta_s$ | ↓ | ↓ | ↓ | ↓ | | ←(ABSOLUTE VALUE) | ←(ABSOLUTE VALUE) | ←(ABSOLUTE VALUE) |
| 315° | | | | | | | | |
| $\theta'=(360°-\theta)+\theta_s$ | ↓ | ←(ABSOLUTE VALUE) | ←(ABSOLUTE VALUE) | ↓ | | | | |
| 360° | | | | | | | | |

ANGLE COMPUTATION METHOD AND APPARATUS FOR VARIABLE RELUCTANCE RESOLVER

BACKGROUND OF THE INVENTION

1. Field of the Invention

The present invention relates to an angle computation method for a variable reluctance resolver (hereinafter VR resolver) which enables an accurate angular detection even when unignorable errors arise from various portions of the resolver, and to an angle computation apparatus for performing the angle computation method.

2. Description of the Related Art

There exist a variety of resolvers, which differ in terms of operation scheme, coil structure, wiring, etc. For example, a VR resolver of a one phase excitation/two phase output includes a stator on which are wound an excitation coil, a SIN voltage output coil, and a COS voltage output coil; and a rotor which has a plurality of salient poles and which, upon rotation within the stator, changes the gap permeance between the two output coils in accordance with a sine function, which is a function of a rotational angle $\theta$. The SIN voltage output coil outputs a sine output voltage, and the COS voltage output coil, which is formed with a phase difference of 90 degrees (electrical angle) with respect to the SIN voltage output coil, outputs a cosine output voltage. The sine and cosine output voltages are induced because of variation in magnetic flux upon rotation of the rotor, and the rotational position of the rotor is detected on the basis of these induced voltages.

The stator of such a VR resolver has a large number of magnetic pole teeth. Each output voltage of the resolver is obtained as the sum total of output voltages of coils wound around corresponding magnetic pole teeth. The voltage output from the SIN voltage output coil for extracting a sine output voltage at each magnetic pole tooth is represented by $\alpha + \beta \sin \theta$. The value of $\sin \theta$ is determined mainly from the shape of the rotor, whereas the values of $\alpha$ and $\beta$ are determined mainly from magnetic paths and coils of the stator. When the outputs of the respective magnetic pole teeth are represented by $\alpha_1 + \beta_1 \sin \theta_1$, $-\alpha_2 + \beta_2 \sin \theta_2$, ... $\alpha_m + \beta_m \sin \theta_m$, the output of the resolver is represented as follows.

$$\sum_{n=1}^{m} (\alpha_n + \beta_n \sin\theta_n) = K\sin\phi$$

The voltage output from the COS voltage output coil for extracting a cosine output voltage can be represented in an analogous manner.

An angle detector used in a resolver and using computation means such as a microcomputer computes an angle, while using the received voltages of the resolver as they are.

In an ideal case where the respective magnetic pole teeth have equal output amplitudes, the value of $\alpha$ is zero, so that the output voltage ($V_{sin}$) of the SIN voltage output coil and the output voltage ($V_{cos}$) of the COS voltage output coil can be represented as follows:

$V_{sin}$=B sin $\theta$, and $V_{cos}$=D cos $\theta$.

However, because of transformation ratio of resolver outputs, short circuits of output coils, run-out of the rotor, variation in magnetic characteristics among stators, variation in coils among stators, and other factors, output error increases, and an accuracy of angle detection deteriorates.

Although such a VR resolver does not generate signals which have clear relations of sin $\theta$ and cos $\theta$, respectively, with respect to the angular position $\theta$ of the shaft, it generates signals which have a high degree of reproducibility and which vary as a function of the shaft position. Angle correction has been performed through utilization of this feature. Specifically, a reference table is prepared, and sin $\theta$ and cos $\theta$ values are corrected with reference to the reference table. The VR resolver is driven at a constant speed, and distorted sine and cosine signals are recorded. These distorted signals are passed through a Fourier transformer in order to extract basic sine and cosine waves. Subsequently, these basic waves are compared with the original, distorted sine and cosine signals output from the resolver, and are used to create a correction reference table for obtaining correction values (see, for example, Japanese Patent Application Laid-Open (kokai) No. 11-51692).

The method of obtaining proper correction values with reference to such a correction reference table has a drawback in that the table must be re-created in accordance with the details of an error, and the procedure of creating the table is complicated and time consuming.

When output errors stemming from the above-described various causes are taken into consideration, the output voltage ($V_{sin}$) of the SIN voltage output coil and the output voltage ($V_{cos}$) of the COS voltage output coil can be represented as follows.

$V_{sin}$=A+B sin $\theta$          Eq. 1

$V_{cos}$=C+D cos $\theta$          Eq. 2

That is, the output voltage ($V_{sin}$) of the SIN voltage output coil and the output voltage ($V_{cos}$) of the COS voltage output coil are offset by DC components A and C, respectively. When, as in the conventional technique, an angle is computed from such output voltages, computation errors are produced under the influence of the DC components A and C.

In order to improve accuracy, the number of turns of coils can be adjusted such that the values of the terms "A" and "C" of Eqs. 1 and 2, which appear as output errors, become zero. However, since the number of turns cannot be increased infinitely, in some cases, the adjustment cannot reduce to zero the values of the terms "A" and "C." Moreover, the number of turns does not necessarily become the same among individual resolvers, because of variation thereamong.

SUMMARY OF THE INVENTION

In view of the foregoing, an object of the present invention is to provide an angle computation method for a variable reluctance resolver, which method can obtain output voltages and an angle with minimized errors, through computation processing, on the basis of error-containing output voltages of the resolver.

Another object of the present invention is to provide an angle computation apparatus for performing the angle computation method.

The present invention employs the following means for solution in order to achieve the above object in relation to an angle computation method and apparatus for a variable reluctance resolver.

First, the maximum and minimum values of measured output voltages $V_{sin}$ and $V_{cos}$ of the resolver are obtained, the following computation is performed in order to obtain offset values A and C, and these values are stored.

$$A = (V_{sin}(\max) + V_{sin}(\min))/2 = V_{SINOFFSET}$$

$$C = (V_{cos}(\max) + V_{cos}(\min))/2 = V_{COSOFFSET}$$

In the above equations, max represents the maximum value within a positive value range, and min represents the minimum value (the sign becomes "−") within a negative value range.

Subsequently, any one of the following means for solution (1) to (3) is employed.

(1) The error is corrected in consideration of offsets of the output voltage of the SIN voltage output coil and the output voltage of the COS voltage output coil. An angle is obtained, while $V_{sin} - A$ is used as an offset-corrected output voltage of the SIN voltage output coil for extracting sine output voltage, and $V_{cos} - C$ is used as an offset-corrected output voltage of the COS voltage output coil for extracting cosine output voltage. Thus, errors in the output voltages are reduced, and angle detection accuracy is improved.

(2) The error is corrected in consideration of the offsets and a difference in amplitude between the output voltage of the SIN voltage output coil and the output voltage of the COS voltage output coil.

$$V_{SINAMP} = (V_{sin}(\max) - V_{sin}(\min))/2$$

$$V_{COSAMP} = (V_{cos}(\max) - V_{cos}(\min))/2$$

$$K = V_{SINAMP}/V_{COSAMP}$$

The above values are obtained, and then an angle is obtained, while $V_{sin} - A$ is used as an output voltage of the SIN voltage output coil for extracting the sine output voltage, and $K(V_{cos} - C)$ is used as an output voltage of the COS voltage output coil for extracting the cosine output voltage. Thus, errors in the output voltages are reduced, and the angle detection accuracy is improved.

(3) The error is corrected in consideration of a shift from the zero point, the offsets, and a difference in amplitude between the output voltage of the SIN voltage output coil and the output voltage of the COS voltage output coil.

$$\theta_{SINPHASE} = \sin^{-1}(V_{SINOFFSET}/V_{SINAMP}) \cong V_{SINOFFSET}/V_{SINAMP}$$

The above value is obtained, and then an angle is obtained, while $V_{sin} - A$ is used as an output voltage of the SIN voltage output coil for extracting the sine output voltage, and $K(V_{cos} - C)$ is used as an output voltage of the COS voltage output coil for extracting the cosine output voltage. Subsequently, the position shift is corrected by use of the angle $\theta_{SINPHASE}$. Thus, errors in the output voltages are reduced, and the angle detection accuracy is improved.

Specifically, the present invention provides the following angle computation methods and apparatuses.

(1) An angle computation method for a VR resolver comprising:

a step a of acquiring an output voltage $V_{sin}$ of a SIN voltage output coil of the resolver and an output voltage $V_{cos}$ of a COS voltage output coil of the resolver, and extracting the maximum value $V_{sin}(\max)$ of the output voltage $V_{sin}$ within a range in which the output voltage $V_{sin}$ assumes a positive value, the maximum value $V_{cos}(\max)$ of the output voltage $V_{cos}$ within a range in which the output voltage $V_{cos}$ assumes a positive value, the minimum value $V_{sin}(\min)$ of the output voltage $V_{sin}$ within a range in which the output voltage $V_{sin}$ assumes a negative value, the minimum value $V_{cos}(\min)$ of the output voltage $V_{cos}$ within a range in which the output voltage $V_{cos}$ assumes a negative value;

a step b of obtaining an offset value $V_{SINOFFSET}$ of the output voltage $V_{sin}$ from the $V_{sin}(\max)$ and the $V_{sin}(\min)$ in accordance with the following Eq. 3, and obtaining an offset value $V_{COSOFFSET}$ of the output voltage $V_{cos}$ from the $V_{cos}(\max)$ and the $V_{cos}(\min)$ in accordance with the following Eq. 4; and a step c of obtaining an angle θ from the output voltage $V_{sin}$, the output voltage $V_{COS}$, the offset value $V_{SINOFFSET}$, and the offset value $V_{COSOFFSET}$ in accordance with the following Eq. 5.

$$V_{SINOFFSET} = (V_{sin}(\max) + V_{sin}(\min))/2 \quad \text{Eq. 3}$$

$$V_{COSOFFSET} = (V_{cos}(\max) + V_{cos}(\min))/2 \quad \text{Eq. 4}$$

$$F(V_{sin} - V_{SINOFFSET}, (V_{cos} - V_{COSOFFSET})) = \theta \quad \text{Eq. 5}$$

(2) In the angle computation method for a VR resolver as described in (1) above, a step d of obtaining an average amplitude $V_{SINAMP}$ of the output voltage $V_{sin}$ from the $V_{sin}(\max)$ and the $V_{sin}(\min)$ in accordance with the following Eq. 6, and obtaining an average amplitude $V_{COSAMP}$ of the output voltage $V_{cos}$ from the $V_{cos}(\max)$ and the $V_{cos}(\min)$ in accordance with the following Eq. 7, and a step e of obtaining a coefficient K from the average amplitude $V_{SINAMP}$ and the average amplitude $V_{COSAMP}$ in accordance with the following Eq. 8 are performed between the steps b and c; and a step f of obtaining an angle θ from the output voltage $V_{sin}$, the output voltage $V_{cos}$, the offset value $V_{SINOFFSET}$, the offset value $V_{COSOFFSET}$, and the coefficient K in accordance with the following Eq. 9 is performed in place of the step c.

$$V_{SINAMP} = (V_{sin}(\max) - V_{sin}(\min))/2 \quad \text{Eq. 6}$$

$$V_{COSAMP} = (V_{cos}(\max) - V_{cos}(\min))/2 \quad \text{Eq. 7}$$

$$K = V_{SINAMP}/V_{COSAMP} \quad \text{Eq. 8}$$

$$F(V_{sin} - V_{SINOFFSET}, K(V_{COS} - V_{COSOFFSET})) = \theta \quad \text{Eq. 9}$$

(3) In the angle computation method for a VR resolver as described in (2) above, a step g of obtaining an angle $\theta_{SINPHASE}$ for zero-point correction from the offset value $V_{SINOFFSET}$ and the average amplitude $V_{SINAMP}$ in accordance with the following Eq. 10 is performed before or after the step e; and a step h of obtaining an angle θ from the output voltage $V_{sin}$, the output voltage $V_{cos}$, the offset value $V_{SINOFFSET}$, the offset value $V_{COSOFFSET}$, the coefficient K, and the angle $\theta_{SINPHASE}$ in accordance with the following Eq. 11 is performed in place of the step f.

$$\begin{aligned}\theta_{SINPHASE} &= \sin^{-1}(V_{SINOFFSET}/V_{SINAMP}) \\ &\cong V_{SINOFFSET}/V_{SINAMP}\end{aligned} \quad \text{Eq. 10}$$

$$F(V_{sin} - V_{SINOFFSET}, K(V_{cos} - V_{COSOFFSET}), \theta_{SINPHASE}) = \theta \quad \text{Eq. 11}$$

(4) An angle computation apparatus for a VR resolver comprising:
output voltage acquiring means for acquiring an output voltage $V_{sin}$ of a SIN voltage output coil of the resolver and an output voltage $V_{cos}$ of a COS voltage output coil of the resolver;
$V_{sin}(\max)$ extracting means for extracting the maximum value $V_{sin}(\max)$ of the output voltage $V_{sin}$ within a range in which the output voltage $V_{sin}$ assumes a positive value;
$V_{cos}(\max)$ extracting means for extracting the maximum value $V_{cos}(\max)$ of the output voltage $V_{cos}$ within a range in which the output voltage $V_{cos}$ assumes a positive value;
$V_{sin}(\min)$ extracting means for extracting the minimum value $V_{sin}(\min)$ of the output voltage $V_{sin}$ within a range in which the output voltage $V_{sin}$ assumes a negative value;
$V_{cos}(\min)$ extracting means for extracting the minimum value $V_{cos}(\min)$ of the output voltage $V_{cos}$ within a range in which the output voltage $V_{cos}$ assumes a negative value;
offset value $V_{SINOFFSET}$ computation means for obtaining an offset value $V_{SINOFFSET}$ of the output voltage $V_{sin}$ from the $V_{sin}(\max)$ and the $V_{sin}(\min)$ in accordance with the following Eq. 12;
offset value $V_{COSOFFSET}$ computation means for obtaining an offset value $V_{COSOFFSET}$ of the output voltage $V_{cos}$ from the $V_{cos}(\max)$ and the $V_{cos}(\min)$ in accordance with the following Eq. 13; and
angle computation means for obtaining an angle θ from the output voltage $V_{sin}$, the output voltage $V_{cos}$, the offset value $V_{SINOFFSET}$, and the offset value $V_{COSOFFSET}$ in accordance with the following Eq. 14.

$$V_{SINOFFSET}=(V_{sin}(\max)+V_{sin}(\min))/2 \qquad \text{Eq. 12}$$

$$V_{COSOFFSET}=(V_{cos}(\max)+V_{cos}(\min))/2 \qquad \text{Eq. 13}$$

$$F(V_{sin}-V_{SINOFFSET},(V_{cos}-V_{COSOFFSET}))=\theta \qquad \text{Eq. 14}$$

(5) In the angle computation apparatus for a VR resolver as described in (4) above,
average amplitude $V_{SINAMP}$ computation means for obtaining an average amplitude $V_{SINAMP}$ of the output voltage $V_{sin}$ from the $V_{sin}(\max)$ and the $V_{sin}(\min)$ in accordance with the following Eq. 15, average amplitude $V_{COSAMP}$ computation means for obtaining an average amplitude $V_{COSAMP}$ of the output voltage $V_{cos}$ from the $V_{cos}(\max)$ and the $V_{cos}(\min)$ in accordance with the following Eq. 16, and coefficient K computation means for obtaining a coefficient K from the average amplitude $V_{SINAMP}$ output from the average amplitude $V_{SINAMP}$ computation means and the average amplitude $V_{COSAMP}$ output from the average amplitude $V_{COSAMP}$ computation means in accordance with the following Eq. 17 are provided between the offset value $V_{SINOFFSET}$ computation means and the offset value $V_{COSOFFSET}$ computation means and the angle computation means; and
angle computation means for obtaining an angle θ from the output voltage $V_{sin}$, the output voltage $V_{cos}$, the offset value $V_{SINOFFSET}$, the offset value $V_{COSOFFSET}$, and the coefficient K in accordance with the following Eq. 18 is provided in place of the angle computation means described in (4) above.

$$V_{SINAMP}=(V_{sin}(\max)-V_{sin}(\min))/2 \qquad \text{Eq. 15}$$

$$V_{COSAMP}=(V_{cos}(\max)-V_{cos}(\min))/2 \qquad \text{Eq. 16}$$

$$K=V_{SINAMP}/V_{COSAMP} \qquad \text{Eq. 17}$$

$$F(V_{sin}-V_{SINOFFSET},K(V_{COS}-V_{COSOFFSET}))=\theta \qquad \text{Eq. 18}$$

(6) In the angle computation apparatus for a VR resolver as described in (5) above,
$\theta_{SINPHASE}$ computation means for obtaining an angle $\theta_{SINPHASE}$ for zero-point correction from the offset value $V_{SINOFFSET}$ and the average amplitude $V_{SINAMP}$ in accordance with the following Eq. 19 is provided; and
angle computation means for obtaining an angle θ from the output voltage $V_{sin}$, the output voltage $V_{cos}$, the offset value $V_{SINOFFSET}$, the offset value $V_{COSOFFSET}$, the coefficient K, and the angle $\theta_{SINPHASE}$ in accordance with the following Eq. 20 is provided in place of the angle computation means of (5) above.

$$\theta_{SINPHASE} = \sin^{-1}(V_{SINOFFSET}/V_{SINAMP}) \qquad \text{Eq. 19}$$
$$\cong V_{SINOFFSET}/V_{SINAMP}$$

$$F(V_{sin}-V_{SINOFFSET},K(V_{cos}-V_{COSOFFSET}),\theta_{SINPHASE})=\theta \qquad \text{Eq. 20}$$

The present invention can eliminate error factors from the output voltages of the output coils of the resolver to thereby improve the angle detection accuracy.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Ideally, voltage ($V_{sin}$) output from a SIN voltage output coil of a resolver and voltage ($V_{cos}$) output from a COS voltage output coil of the resolver can be expressed as follows:

$V_{sin}$=B sin θ, and $V_{Cos}$=D cos θ.

In actuality, however, the output voltages contain errors; i.e., fail to change as a function of sin θ or cos θ because of, for example, an improper rotor shape or an eccentricity of the rotor shaft. In addition, since amplitudes of the output voltages from respective magnetic pole teeth are not identical with one another, the values of the term α are non-zero, thus generating errors. Accordingly, the output voltages from the SIN voltage output coil and the COS voltage output coil are expressed as follows:

$$V_{sin} = A + B \sin \theta, \text{ and}$$

$$V_{cos} = C + D \cos \theta.$$

Figure 2:
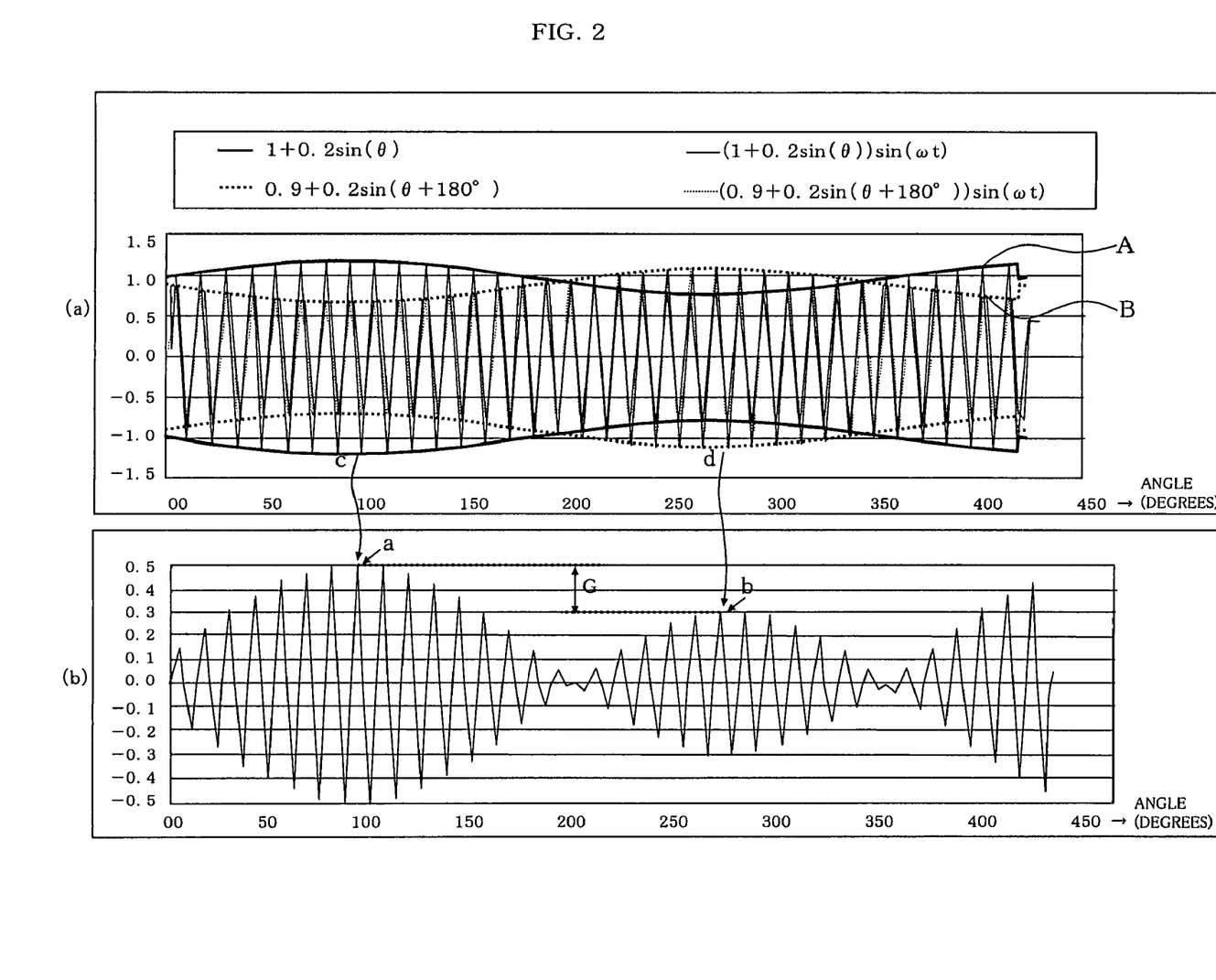
FIG. 2 is a pair of waveform diagrams showing an influence of errors.

Influences of such errors will next be described with reference to FIG. 2. FIG. 2 consists of two charts showing waveforms for explaining influences of errors. The waveforms of the output signals having different offset values (DC components) are plotted in FIG. 2(a). FIG. 2(b) shows deviations between the output signals of FIG. 2(a). Here, θ is the rotating angle of the rotor, and ω is the angular velocity corresponding to the frequency of an excitation signal supplied to the excitation coil.

Of the output voltages of the resolver, the output voltage of the SIN voltage output coil for extracting a sine output voltage is represented by α+β sin(θ). For example, when a α=1 and β=0.2, the output voltage is represented by (1+0.2 sin(θ))sin(ωt). The envelope of the output voltage is represented by a line A.

For comparison, a case where the value of α decreases from 1 to 0.9 because of another error; i.e., a case where α=0.9 and β=0.2, will be considered. In this case, the output voltage is represented by (0.9+0.2 sin(θ))sin(ωt), and the envelope of the output voltage is represented by a line B.

In order to determine the influence of the error in such a case, the deviation; i.e., the change from the characteristic represented by the line A to that represented by the line B, is studied.

Basically, the function sin(θ) produces the same waveform in a range of θ=0 degrees to 180 degrees and in a range of θ=180 degrees to 360 degrees, although its polarity changes from positive (in the former range) to negative (in the latter range). Therefore, when the waveform of sin(θ) and the waveform of sin (θ+180°) are superimposed on one another, the same waveform representing the deviation between these two waveforms is repeated at an interval of every 180 °.

Here, there will considered a case where the output voltage waveforms represented by the line A and the line B, respectively, are continuously output over an angle range of 180° because of various causes of error. In order to determine the deviation over the angle range of 180°, a phase difference of 180° is provided between the output voltage waveforms represented by the line A and the line B; i.e., the output voltage waveform of the line B is represented by (0.9+0.2 sin(θ+180°))sin(ωt).

The deviation between the line A and the line B is shown in FIG. 2(b). As shown in FIG. 2(b), the maximum deviation a between the lines in the 180-degree angle range of 0° to 180° of FIG. 2(a) is 0.5, whereas the maximum deviation b between the lines in the 180-degree angle range of 180° to 360° of FIG. 2(a) is 0.3. As a result, the difference G between these deviations assumes a large value of 0.2.

As is understood from above, when the DC component changes 10% from 1 to 0.9 within an angle range of 180 degrees stemming from various causes of error, in each 180-degree angle range, the output voltage signals assume different maximum output values, and different deviations between the maximum values.

Although the above is a study on error factors which affect the DC components, other error factors must be considered as well.

A prototype resolver that was actually fabricated will next be described in detail.

Table 1 shows data of the prototype resolver. SIN and COS voltage output coils are designed such that these coils produce output voltages of the same amplitude.

TABLE 1

| Data of a prototype resolver | | Stator 2 | |
|---|---|---|---|
| Transformation ratio | 0.2608 | | |
| Electrical error (width) | 283.92 | | |
| | | SIN | COS |
| MAX | | 1.948 | 2.001 |
| MIN | | −2.105 | −2.008 |
| AMP | | 2.026 | 2.004 |
| OFFSET | | −0.07822 | −0.00316 |

In Table 1, transformation ratio represents the ratio of the number of turns of the excitation coil to the number of turns of output coils; electrical error (width) represents the error of the resolver output voltage to the normal input voltage; MAX represents the maximum output voltage measured from the reference voltage (0 voltage) in the positive voltage region; MIN represents the minimum output voltage measured from the reference voltage (0 voltage) in the negative voltage region; AMP represents the mean value of the absolute values of MAX and MIN (AMP=(|MAX|+|MIN|)/2); and OFFSET represents half the difference between MAX and MIN (OFFSET=(MAX+MIN)/2).

Figure 3:
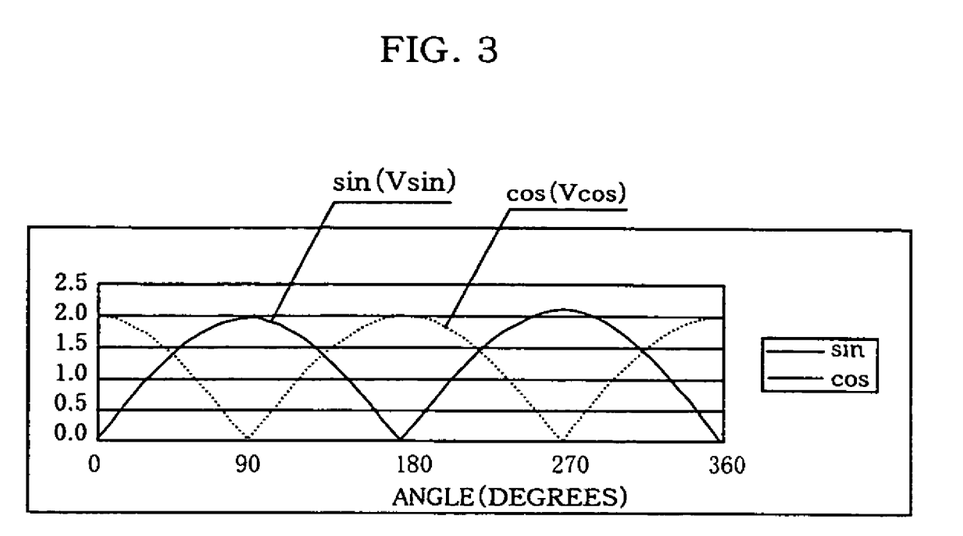
FIG. 3 shows voltage characteristic curves based on data of a prototype resolver.

FIG. 3 shows voltage characteristic curves based on data of the prototype resolver. In FIG. 3, the absolute values of the voltages are plotted. $V_{sin}$ is the output voltage from the SIN voltage output coil for extracting a sine output voltage. $V_{cos}$ is the output voltage from the COS voltage output coil for extracting a cosine output voltage. As is clear from Table 1 and FIG. 3, the output voltage from the SIN voltage output coil and the output voltage from the COS voltage output coil differ from each other in terms of MAX, MIN, AMP, and OFFSET. In this case as well, angle ranges of about 180 degrees in which output voltages assume the positive polarity and angle ranges of about 180 degrees in which output voltages assume the negative polarity are each considered as a unit.

Figure 4A:
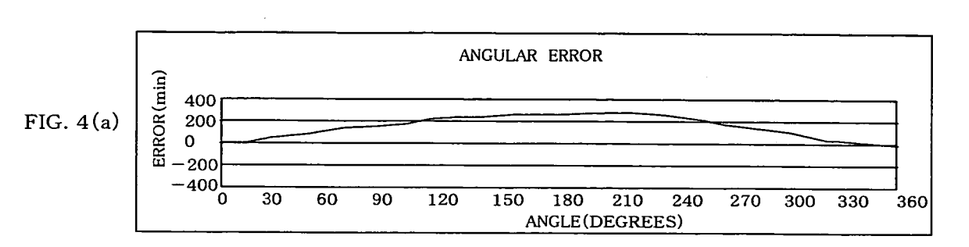
FIGS. 4(a) to 4(d) are explanatory views showing angular errors in the resolver of the present invention, and a resolver of a conventional technique.
Figure 4B:
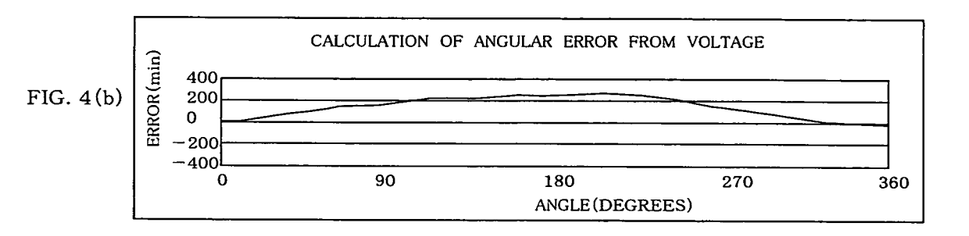

Angular errors will next be described in detail. FIGS. 4(a) to 4(d) show angular errors as observed in the resolver of the present invention and a conventional resolver. FIG. 4(a) shows the angular error of the prototype resolver, which was measured, by use of an R/D (resolver/digital) converter, for each reference input angle (an angle attained through an accurate rotation of the resolver by a predetermined amount by means of a rotary machine, serving as a reference). FIG. 4(b) shows the angular error of the prototype resolver for each reference input angle, the error being computed on the basis of the voltages output from the output voltage coils. The errors are represented using the unit "min" (60 min=1 degree). FIGS. 4(a) and 4(b) demonstrate that the angular error measured by use of the R/D converter and that computed on the basis of the output voltages generally coincide with each other. Notably, an angular error characteristic varies among prototype resolvers. In the case of the measured prototype resolver, as shown in FIGS. 4(a) and 4(b), a maximum error of about 300 min is produced near 210° and a minimum error of about 0 min is produced at 0° (360°). In one rotation cycle (360°), the error smoothly increases toward the maximum and then smoothly decreases, forming a gently sloping hill. Characteristics of the error are as follows:

(a) Since the error reaches the maximum at 210°, the error exhibits an irregular characteristic pattern in the 360° angle range.

(b) Since the error exhibits a profile of a gently sloping hill in each rotation cycle (360°), the error is not caused by only one factor. The error is likely generated by a plurality of factors that depend on the –rotation angle.

In view of the foregoing, the error can be reduced by the following steps:

(1) In order to eliminate the deviation, from the reference voltage, of the output voltage from the SIN voltage output coil for extracting a sine output voltage, the deviations of the maximum value (in the positive value range) and the minimum value (in the negative value range) are corrected so as to return the position of the zero point to the reference point. This is an effective method, although the positive and negative waveforms are not symmetric.

(2) In order to eliminate the deviation, from the reference voltage, of the output voltage from the COS voltage output coil for extracting a cosine output voltage, the deviations of the maximum value (in the positive value range) and the minimum value (in the negative value range) are corrected so as to return the position of the zero point to the reference point. This is an effective method, although the positive and negative waveforms are not symmetric.

The reason why the error is eliminated will next be described.

As mentioned above, the resolver output voltage including errors originated from magnetic paths, coils, etc. can be approximated as follows:

$$V_{sin} = A + B \sin \theta \qquad \text{Eq. 21}$$

$$V_{cos} = C + D \cos \theta \qquad \text{Eq. 22}$$

Figure 5:
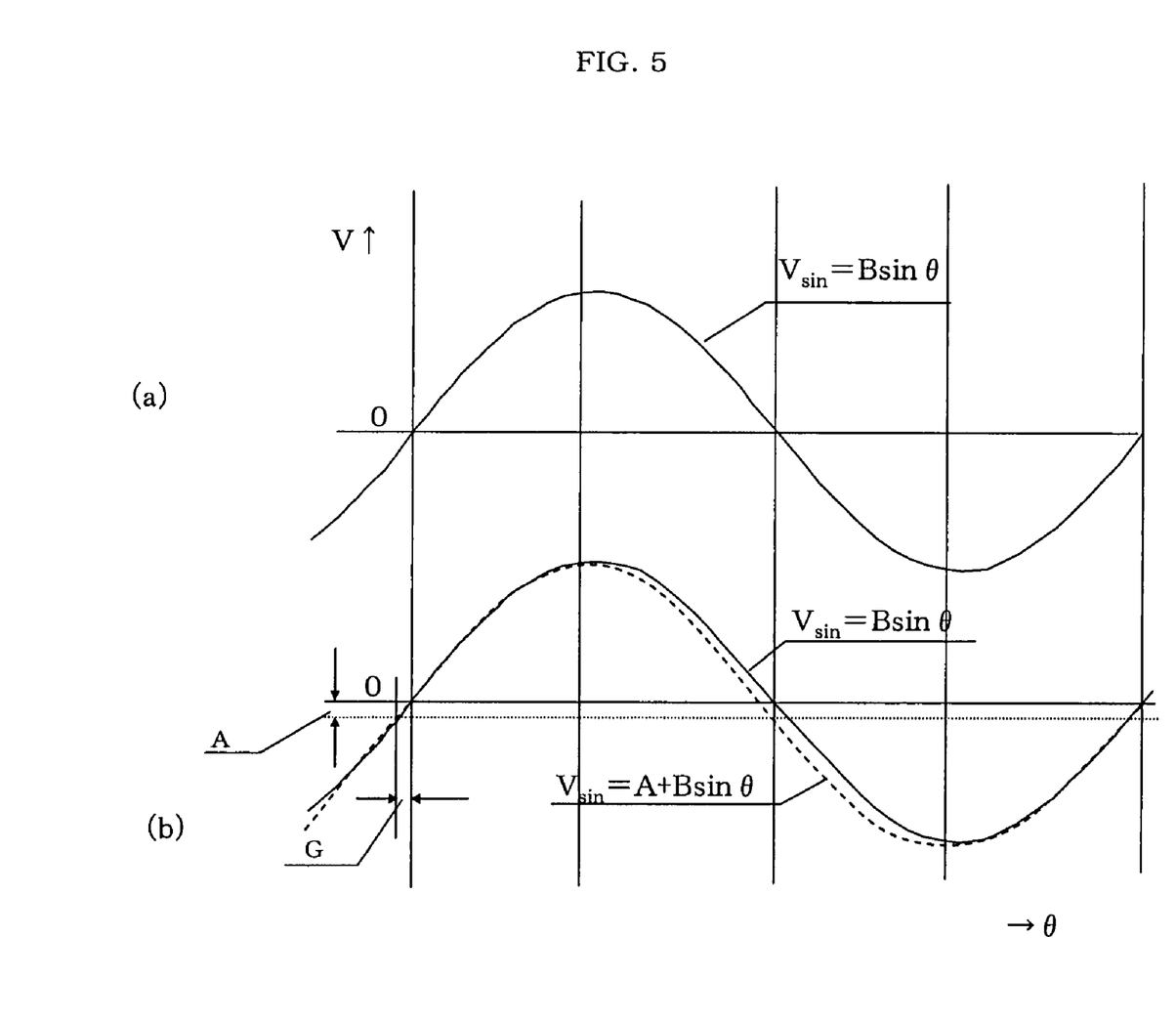
FIG. 5 is a graph used for explaining the principle of correction according to the present invention.

FIG. 5 is a graph used for explaining the principle of correction according to the present invention. The ideal sine output voltage ($V_{sin}$=B sin θ) is plotted in the upper section (a) of FIG. 5.

When the term A in Eq. 21 assumes a positive value, $V_{sin}$ has a signal waveform as shown in the lower section (b) of FIG. 5.

Specifically, the voltage varies in accordance with B sin θ from a reference level, which is higher than the level of 0 volts by an offset voltage A corresponding to the value of the term A. Therefore, when the offset voltage A is subtracted from the output voltage, at least a portion of the error attributable to the DC component can be eliminated, whereby the accuracy of the output voltages and the accuracy of an angle determined therefrom can be improved. Subsequently, in the case where the SIN voltage output coil for extracting a sine output voltage has the same number of turns as the COS voltage output coil for extracting a cosine output voltage, the output voltages of these output coils are calibrated. For such calibration, a coefficient, K=$V_{SINAMP}$/$V_{COSAMP}$, is obtained. This calibration step further improves the accuracy of the output voltages and the accuracy of the determined angle. Up to these steps, the offset voltage has been corrected. However, since the detected output voltage waveforms have irregular patterns as described in (a) and (b), the zero points at which the output voltages become zero are expected to have deviated from correct zero points. Therefore, the shift of zero points, which has not been corrected through the above steps, is corrected through shifting by an amount corresponding to the difference G shown in FIG. 5(b). Performance of the above-described steps is expected to improve the accuracy of the output voltages and the accuracy of the determined angle.

Figure 4C:
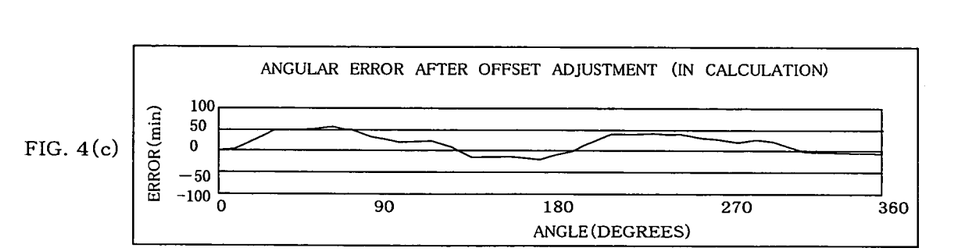
Figure 4D:
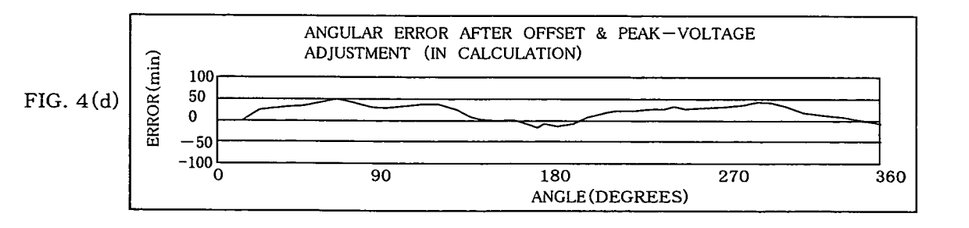

When the above-described steps are performed in calculation, the angular error is reduced as shown in FIGS. 4(c) and 4(d). FIG. 4(c) is a characteristic diagram showing an angular error after adjustment of the offset voltage (in calculation). The maximum error (MAX) is about 60 min, which is one-fifth the maximum error of about 300 min shown in FIGS. 4(a) and 4(b). The minimum error (MIN) is about 25 min, which is substantially the same as the minimum error shown in FIGS. 4(a) and 4(b). Further, the obtained characteristic curve having two peaks is better than the characteristic curve having a single peak shown in FIGS. 4(a) and 4(b).

FIG. 4(d) is a characteristic diagram showing an angular error after adjustment of the offset voltage and peak voltage (in calculation).

The characteristic of FIG. 4(d) is further improved as compared with that of FIG. 4(c).

Specific Means for Solution:

In order to perform the following steps, the following values are calculated in advance, or when necessary, from the output voltages of the resolver and in accordance with the following equations, and are stored if necessary.

$$V_{SINOFFSET} = (V_{\sin}(\max) + V_{\sin}(\min))/2$$

$$V_{SINAMP} = (V_{\sin}(\max) - V_{\sin}(\min))/2$$

$$\theta_{SINPHASE} = \sin^{-1}(V_{SINOFFSET}/V_{SINAMP})$$

$$\cong V_{SINOFFSET}/V_{SINAMP}$$

$$V_{COSOFFSET} = (V_{\cos}(\max) + V_{\cos}(\min))/2$$

$$V_{COSAMP} = (V_{\cos}(\max) - V_{\cos}(\min))/2$$

$$K = V_{SINAMP}/V_{COSAMP}$$

In the above equations, max is the maximum value within the positive value range, and min is the minimum value within the negative value range (sign becomes "−").

Definition of Function for Obtaining Angle θ.

Figure 6A:
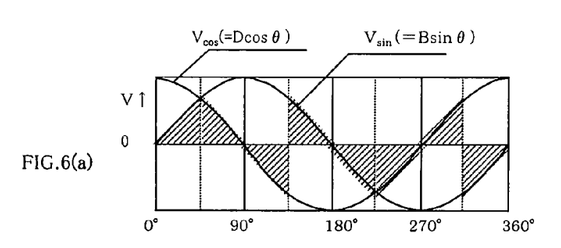
FIG. 6(a) to 6(c) are a graph and tables used for explaining a function F for obtaining an angle θ according to the present invention.
Figure 6B:
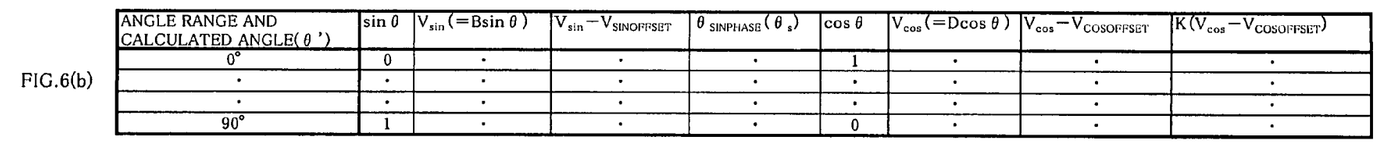
Figure 6C:
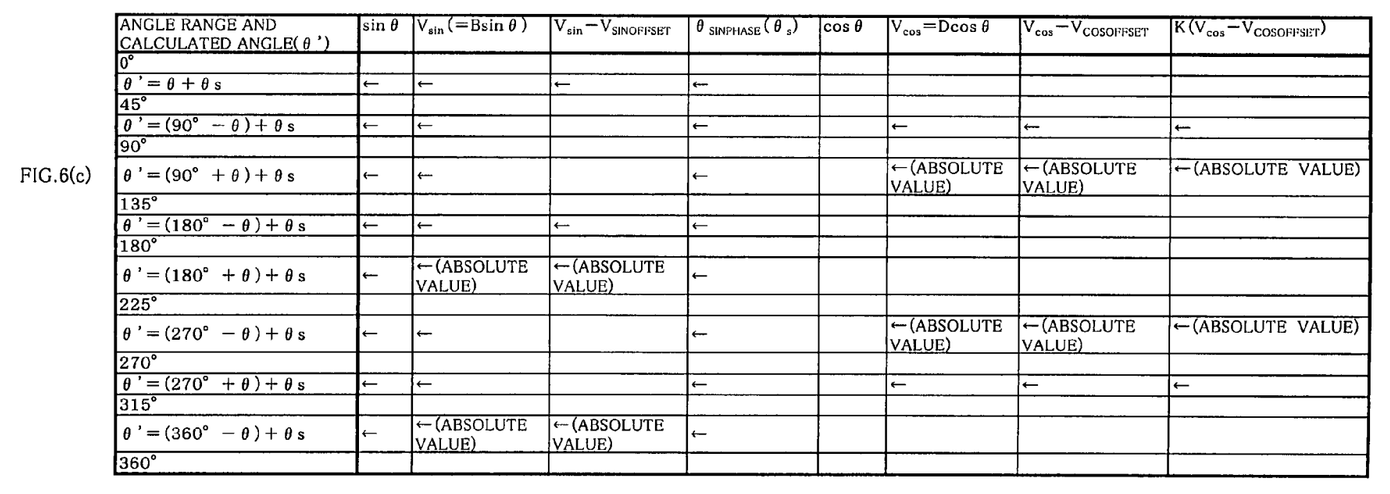

FIGS. 6(a) to 6(c) show a graph and tables used for explaining a function F for obtaining an angle θ. FIG. 6(a) is a graph showing the relationship between employed coil voltages and angle ranges; FIG. 6(b) is a table showing variables used in the function for obtaining an angle θ; and FIG. 6(c) is a table showing variables used for obtaining an angle θ'.

Variables which are used in the function for obtaining an angle θ and which are used in the following description are provided in the form of a table shown in FIG. 6(b). An angle θ is a function of $V_{SIN}$, $V_{SIN}$−$V_{SINOFFSET}$, $V_{COS}$, $V_{COS}$−$V_{COSOFFSET}$, K($V_{COS}$−$V_{COSOFFSET}$), and $\theta_{SINPHASE}$. The general formula can be represented by the following. Eq. 23.

$$F(V_{sin}, (V_{cos}), (\theta_{SINPHASE})) = \theta \qquad \text{Eq. 23}$$

In the leftmost column of the table, there are listed values of an angle θ serving as a reference (hereinafter referred to as a reference angle θ) and being continuously changed at an arbitrary change rate within the range between 0° to 90°. In each row, the following items (1) to (8) corresponding to the reference angle θ are listed:

(1) sin θ;
(2) actually measured voltage $V_{sin}$ of the SIN coil (i.e., actually measured voltage such that when the actual value is represented by B sin θ (ideal form), the value of θ corresponds to the reference angle θ);
(3) corrected voltage ($V_{SIN}$-$V_{SINOFFSET}$) obtained through correction of the actually measured voltage of the SIN coil by use of an offset voltage (i.e., the voltage ($V_{SIN}$-$V_{SINOFFSET}$) such that when the voltage ($V_{SIN}$-$V_{SINOFFSET}$) is represented by B sin θ (ideal form), the value of θ corresponds to the reference angle θ);
(4) angle $θ_{SINPHASE}$ (zero-point correction angle after correction of the actually measured voltage $V_{sin}$ of the SIN coil by use of an offset voltage; i.e., the zero-point correction angle determined such that when the corrected voltage ($V_{SIN}$-$V_{SINOFFSET}$) is represented by B sin θ (ideal form), the value of θ corresponds to the reference angle θ);
(5) cos θ;
(6) actually measured voltage $V_{cos}$ of the COS coil (i.e., actually measured voltage such that when the actual value is represented by D cos θ (ideal form), the value of θ corresponds to the reference angle θ);
(7) corrected voltage ($V_{COS}$-$V_{COSOFFSET}$) obtained through correction of the actually measured voltage of the COS coil by use of an offset voltage (i.e., the voltage ($V_{COS}$-$V_{COSOFFSET}$) such that when the voltage ($V_{COS}$-$V_{COSOFFSET}$) is represented by D cos θ (ideal form), the value of θ corresponds to the reference angle θ); and
(8) voltage K($V_{COS}$-$V_{COSOFFSET}$) obtained through normalization of the corrected voltage ($V_{COS}$-$V_{COSOFFSET}$) by use of a normalization coefficient K for normalizing the output voltage of the COS coil with respect to the output voltage of the SIN coil (i.e., the voltage K($V_{COS}$-$V_{COSOFFSET}$) determined such that when the voltage K($V_{COS}$-$V_{COSOFFSET}$) is represented by D cos θ (ideal form), the value of θ corresponds to the reference angle θ).

The function F for obtaining an angle θ is configured through modification of the variables—($V_{sin}$, $V_{cos}$, $θ_{SINPHASE}$) of the general formula in such a manner that in accordance with the required accuracy, the variable ($V_{SIN}$-$V_{SINOFFSET}$) is used in place of the variable $V_{sin}$, and the variable ($V_{COS}$-$V_{COSOFFSET}$) or the variable K($V_{COS}$-$V_{COSOFFSET}$) is used in place of the variable $V_{cos}$, and if necessary, a value other than zero is used for the variable $θ_{SINPHASE}$. This will be further described below.

(a) Judgment of Quadrant of Rotor

The quadrant of the rotor is determined on the basis of the resolver output voltages, the polarity of the value of sin θ of the SIN coil output, and the polarity of the value of cos θ of the COS coil output.

TABLE 2

| First Quadrant | $V_{SIN(θ)} \geq 0$, $V_{COS(θ)} \geq 0$ |
|---|---|
| Second Quadrant | $V_{SIN(θ)} \geq 0$, $V_{COS(θ)} < 0$ |
| Third Quadrant | $V_{SIN(θ)} < 0$, $V_{COS(θ)} < 0$ |
| Fourth Quadrant | $V_{SIN(θ)} < 0$, $V_{COS(θ)} > 0$ |

Notably, $V_{SIN}(θ)$ represents the output voltage of the SIN coil of the resolver at an angle θ, and is also denoted as $V_{SIN}$. $V_{COS}(θ)$ represents the output voltage of the COS coil of the resolver at an angle θ, and is also denoted as $V_{COS}$.

Respective quadrants will be described.

(b) Processing for Each Quadrant (i) Selection of SIN θ and COS θ

For example, when the angle θ is equal to or greater than 45° (45° to 90°) in the first quadrant, the value of SIN θ/θ (radian) becomes small, so that the level or frequency of an encode signal decreases. Therefore, in an angle range not greater than 45° (0° to 45°), the output voltage $V_{SIN}(θ)$ of the SIN coil of the resolver at an angle θ is employed, and in an angle range greater than 45°, the output voltage $V_{cos}(θ)$ of the COS coil of the resolver at an angle θ is employed.

The encode signal is a digital signal of, for example, 12 bits. When the resolution is maintained constant, the number of bits of the encode signal increases with the dynamic range. Therefore, the dynamic range is set to an arbitrary small range; e.g., a range of sin 0° to sin 90°.

Notably, in the case where the actually measured value of the output voltage $V_{SIN}(θ)$ does not increase or decrease continuously because of measurement error or other factors, a hysteresis band may be provided for the actually measured value in order to maintain the continuity of the actually measured value.

In the remaining second, third, and fourth quadrants, when the value of $V_{SIN}(θ)$ or $V_{cos}(θ)$ is negative, its absolute value is obtained in order to convert the negative value to a positive value, and then the table of the function F for obtaining an angle θ is searched.

Through the above-described procedures, the relationship between to-be-employed coil voltages and angle ranges are set as indicated by hatching in FIG. 6(a). For convenience, other quadrants will be described.

TABLE 3

| Angle | Employed Voltage |
|---|---|
| 0° to 45° | $V_{SIN(θ)}$ |
| 45° to 90° | $V_{COS(θ)}$ |
| 90° to 135° | $V_{COS(θ)}$ |
| 135° to 180° | $V_{SIN(θ)}$ |
| 180° to 225° | $V_{SIN(θ)}$ |
| 225° to 270° | $V_{COS(θ)}$ |
| 270° to 315° | $V_{COS(θ)}$ |
| 315° to 360° | $V_{SIN(θ)}$ |

Next, on the basis of Table 3, in the angle range of, for example, 0° to 45°, an actually measured value of $V_{SIN}(θ)$ is represented by B sin θ (ideal form). Similarly, in the angle range of, for example, 45° to 90°, an actually measured value of $V_{cos}(θ)$ is represented by D cos θ (ideal form). Subsequently, in accordance with the required accuracy, the following values are calculated and stored.

$$V_{SINOFFSET} = (V_{sin}(\max) + V_{sin}(\min))/2$$

$$V_{SINAMP} = (V_{sin}(\max) - V_{sin}(\min))/2$$

$$θ_{SINPHASE} = \sin^{-1}(V_{SINOFFSET}/V_{SINAMP})$$

$$\cong V_{SINOFFSET}/V_{SINAMP}$$

$$V_{COSOFFSET} = (V_{cos}(\max) + V_{cos}(\min))/2$$

$$V_{COSAMP} = (V_{cos}(\max) - V_{cos}(\min))/2$$

$$K = V_{SINAMP}/V_{COSAMP}$$

Subsequently, as shown in FIG. 6(b), the following values are obtained in accordance with the accuracy. Notably, $V_{SIN}=V_{SIN}(θ)$ and $V_{COS}=V_{COS}(θ)$ "$V_{SIN}-V_{SINOFFSE}$"
"$\theta_{SINPHASE}$"
"$V_{COS}-V_{COSOFFSET}$"
"$K(V_{COS}-V_{COSOFFSET})$"

Each row of the table of FIG. 6(b) shows the following. As to the output of the SIN coil, the value of "$V_{SIN}-V_{SINOFFSET}$" assumes a value equal to the actually measured value of "$V_{SIN}(\theta)$", "sin θ" means sin θ of "B sin θ" of an ideal form, and an angle θ' is obtained on the basis of the angle θ of "sin θ" and in accordance with the computation equation in the θ' column at the left end. As to the output of the COS coil, the value of "$V_{COS}-V_{COSOFFSET}$" and the value of "$K(V_{COS}-V_{COSOFFSET})$" assume values equal to the actually measured value of "$V_{cos}(\theta)$," "cos θ" means cos θ of "D cos θ" of an ideal form, and an angle θ' is obtained on the basis of the angle θ of "cos θ" and in accordance with the computation equation in the θ' column on the left end. Ideally, K is 1. In actuality, since $V_{SIN}$ and $V_{COS}$ have different amplitudes in each quadrant, $V_{COS}$ must be normalized with respect to $V_{SIN}$ in the first quadrant.

Next, there will be described the steps for obtaining an angle θ' through searching the above-described table of the function F of an angle θ.

In the angle range of, for example, 0° to 45°, when the value of "$V_{SIN}-V_{SINOFFSET}$" obtained in accordance with the accuracy becomes equal to the actually measured value of "$V_{SIN}(\theta)$," an angle θ corresponding to the sin θ of "B sin θ" represents an angle θ' to be obtained.

In the angle range of, for example, 45° to 90°, when the value of "$V_{COS}-V_{COSOFFSET}$" or the value of "$K(V_{COS}-V_{COSOFFSET})$" obtained in accordance with the accuracy becomes equal to the actually measured value of "$V_{cos}(\theta)$," an angle θ corresponding to the sin θ of B sin θ corresponding to the value of the above-described D cos θ is obtained, and an angle θ' is obtained by subtracting θ from 90° (angle θ'=90°−θ).

The reason why the angle θ' is obtained in the above-described manner is that, as shown in FIG. 6(a), in the angle range of 45° to 90°, the value of sin θ increases, but the value of cos θ decreases. If this cos θ is used in place of the sin θ value, the obtained angle decreases from 45° toward 0°. In order to attain an increase instead of such a decrease and in order not to increase the range of the encode signal, an angle is obtained by use of the value of sin 0° to sin 45°. Accordingly, the angle θ' is obtained by subtracting θ from 90° (angle θ'=90°−θ).

For a negative value; e.g., a negative value of $V_{COS}$ within the range of 90° to 135°, the absolute value thereof is obtained so as to convert the value to a positive value. Subsequently, an angle θ' is obtained by the same steps as described above.

Zero-point correction is performed by use of the value of "$\theta_{SINPHASE}$ (radian)." That is, the value of "$\theta_{SINPHASE}$" is added to or subtracted from the correction angle θ in the above-described steps.

Next, there will be described steps which are performed in accordance with the required accuracy.

Step 1: The error is corrected in consideration of offsets of the output voltage of the SIN voltage output coil and the output voltage of the COS voltage output coil. The above-described OFFSET values; i.e., offset components (DC components) $V_{SINOFFSET}$ and $V_{COSOFFSET}$ are obtained from the output voltage, and then the computation equation for obtaining an angle from the resolver signals is corrected by use of the OFFSET values as shown in the following Eq. 24, to thereby improve computation accuracy. Notably, the value of "$\theta_{SINPHASE}$" is set to zero.

$$F(V_{sin}-V_{SINOFFSET}, (V_{COS}-V_{COSOFFSET}))=\theta \qquad \text{Eq. 24}$$

Step 2: The error is corrected in consideration of offsets, a difference in amplitude between the output voltage of the SIN voltage output coil and the output voltage of the COS voltage output coil.

$$V_{SINAMP}=(V_{sin}(\max)-V_{sin}(\min))/2$$

$$V_{COSAMP}=(V_{cos}(\max)-V_{cos}(\min))/2$$

$$K=V_{SINAMP}/V_{COSAMP}$$

The above values are obtained, and then an angle is obtained in accordance with the below-described equation Eq. 25, while $V_{sin}$−A is used as an output voltage of the SIN voltage output coil for extracting the sine output voltage, and $K(V_{cos}$−C) is used as an output voltage of the COS voltage output coil for extracting the cosine output voltage. Notably, the value of "$\theta_{SINPHASE}$" is set to zero. This step reduces errors in the output voltage to thereby improve the angle detection accuracy.

$$F(V_{sin}-V_{SINOFFSET}, K(V_{cos}-V_{COSOFFSET}))=\theta \qquad \text{Eq. 25}$$

Step 3: The error is corrected in consideration of a shift from the zero point, offsets, and a difference in amplitude between the output voltage of the SIN voltage output coil and the output voltage of the COS voltage output coil.

$$\theta_{SINPHASE} = \sin^{-1}(V_{SINOFFSET}/V_{SINAMP})$$
$$\cong V_{SINOFFSET}/V_{SINAMP}$$

The above value is obtained, and then an angle is obtained in accordance with the above-described equation Eq. 25, while $V_{sin}$−A is used as an output voltage of the SIN voltage output coil for extracting the sine output voltage, and $K(V_{cos}$−C) is used as an output voltage of the COS voltage output coil for extracting the cosine output voltage. Subsequently, the position shift is corrected by use of the value of "$\theta_{SINPHASE}$" in accordance with the following Eq. 26.

$$F(V_{sin}-V_{SINOFFSET}, K(V_{cos}-V_{COSOFFSET}), \theta_{SINPHASE})=\theta \qquad \text{Eq. 26}$$

EXAMPLE 1

Figure 1:
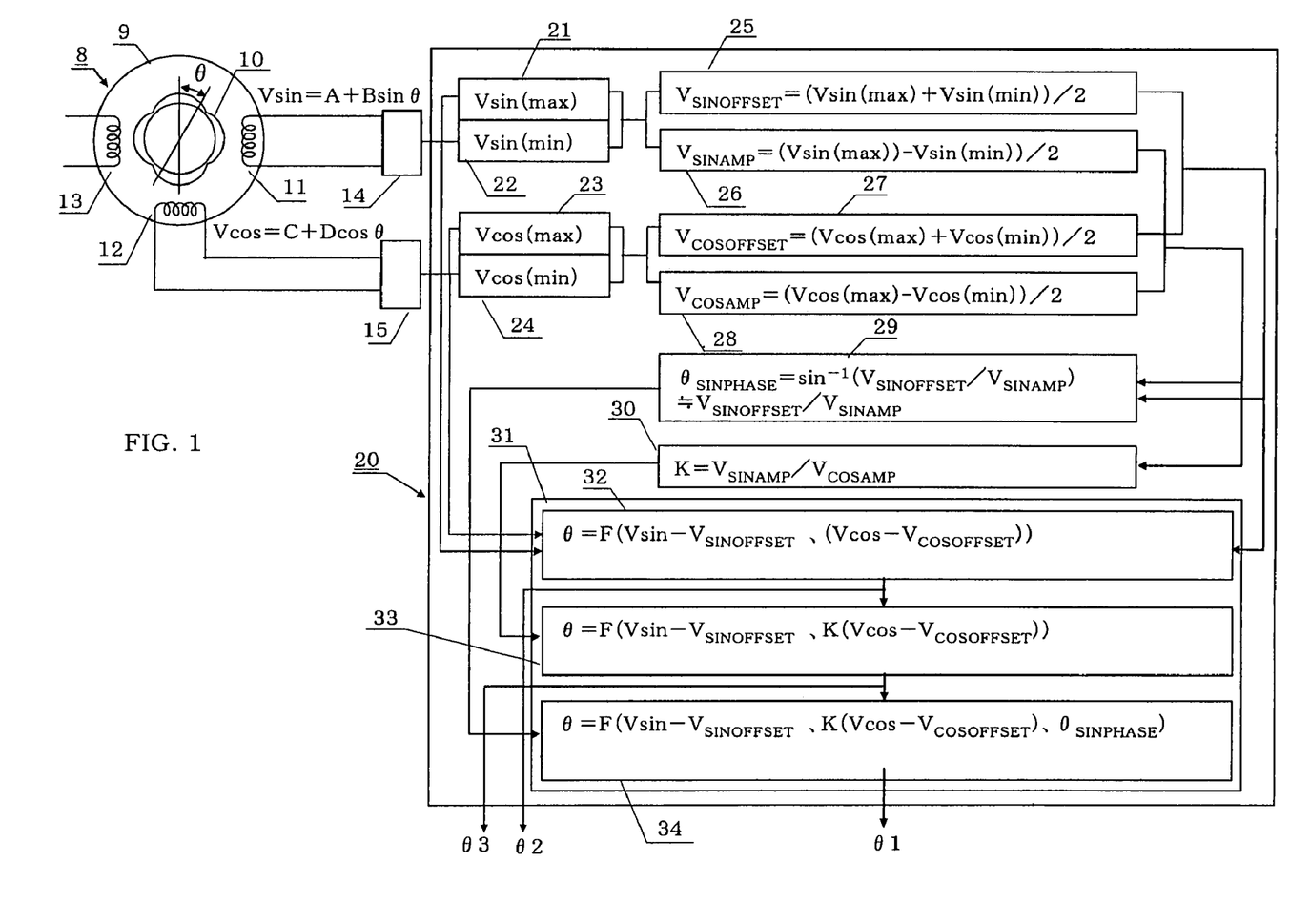
FIG. 1 is a block diagram of an angle computation apparatus for a VR resolver according to the present invention.

FIG. 1 is a block diagram of an angle computation apparatus for a VR resolver according to the present invention.

A VR resolver 8 includes a stator 9 and a rotor 10.

A SIN voltage output coil 11, a COS voltage output coil 12, and an excitation coil 13 are provided on respective magnetic pole teeth of the stator 9. When the rotary shaft is rotated with the excitation coil 13 excited, a voltage output from the SIN voltage output coil 11 is detected by means of an output voltage detector 14. Similarly, a voltage output from the COS voltage output coil 12 is detected by means of an output voltage detector 15.

Outputs of the output voltage detectors 14 and 15 are input to an angle computation apparatus 20, which outputs an angle signal θ through performance of necessary computation processing.

The angle computation apparatus 20 is formed of a microcomputer which consists of a CPU (central processing unit), memory, input/output interfaces, etc., and executes the steps described below, by means of a predetermined program. The program may be read from the outside or may be provided in the form of firmware. A table storing variables to be used with a function for obtaining an angle θ and data such as resolver output voltages are stored in the memory.

The angle computation apparatus 20 includes $V_{sin}$(max) extraction means 21, $V_{sin}$(min) extraction means 22, $V_{cos}$(max) extraction means 23, $V_{cos}$(min) extraction means 24, offset value $V_{SINOFFSET}$ calculation means 25, average amplitude $V_{SINAMP}$ calculation means 26, offset value $V_{COSOFFSET}$ calculation means 27, average amplitude $V_{COSAMP}$ calculation means 28, angle $\theta_{SINPHASE}$ calculation means 29, coefficient K calculation means 30, and angle calculation means 31. The angle calculation means 31 includes first angle calculation means 32, second angle calculation means 33, and third angle calculation means 34.

The angle computation apparatus 20 is configured to perform the following steps.

Step (1):

The $V_{sin}$(max) extraction means 21 samples the output ($V_{sin}$=A+B sin θ) of the output voltage detector 14, extracts $V_{sin}$(max), and stores the same. Similarly, the $V_{sin}$(min) extraction means 22 samples the output ($V_{sin}$=A+B sin θ) of the output voltage detector 14, extracts $V_{sin}$(min), and stores the same.

Step (2):

The $V_{cos}$(max) extraction means 23 samples the output ($V_{cos}$=C+D cos θ) of the output voltage detector 15, extracts $V_{cos}$(max), and stores the same. Similarly, the $V_{cos}$(min) extraction means 24 samples the output ($V_{cos}$=C+D cos θ) of the output voltage detector 15, extracts $V_{cos}$(min), and stores the same.

Step (3):

The offset $V_{SINOFFSET}$ calculation means 25 obtains an offset value $V_{SINOFFSET}$ of $V_{sin}$ from the values of $V_{sin}$(max) and $V_{sin}$(min) obtained in step (1), in accordance with the following equation Eq. 27.

$$V_{SINOFFSET}=(V_{sin}(\max)+V_{sin}(\min))/2 \qquad \text{Eq. 27}$$

Step (4):

The average amplitude $V_{SINAMP}$ calculation means 26 calculates an average amplitude $V_{SINAMP}$ of $V_{sin}$ from the values of $V_{sin}$(max) and $V_{sin}$(min) obtained in step (1), in accordance with the following equation Eq. 28.

$$V_{SINAMP}=(V_{sin}(\max)-V_{sin}(\min))/2 \qquad \text{Eq. 28}$$

Step (5):

The offset $V_{COSOFFSET}$ calculation means 27 obtains an offset value $V_{COSOFFSET}$ of $V_{cos}$ from the values of $V_{cos}$(max) and $V_{cos}$(min) obtained in step (2), in accordance with the following equation Eq. 29.

$$V_{COSOFFSET}=(V_{cos}(\max)+V_{cos}(\min))/2 \qquad \text{Eq. 29}$$

Step (6):

The average amplitude $V_{COSAMP}$ calculation means 28 calculates an average amplitude $V_{COSAMP}$ of $V_{cos}$ from the values of $V_{cos}$(max) and $V_{cos}$(min) obtained in step (2), in accordance with the following equation Eq. 30.

$$V_{COSAMP}=(V_{cos}(\max)-V_{cos}(\min))/2 \qquad \text{Eq. 30}$$

Step (7):

The angle $\theta_{SINPHASE}$ calculation means 29 calculates a zero-point correction value $\theta_{SINPHASE}$ from the offset value $V_{SINOFFSET}$ obtained in step (3) and the average amplitude $V_{SINAMP}$ obtained in step (4), in accordance with the following equation Eq. 31.

$$\theta_{SINPHASE} = \sin^{-1}(V_{SINOFFSET}/V_{SINAMP}) \qquad \text{Eq. 31}$$
$$\cong V_{SINOFFSET}/V_{SINAMP}$$

Step (8):

The coefficient K calculation means 30 calculates a coefficient K from the average amplitude $V_{SINAMP}$ obtained in step (4) and the average amplitude $V_{COSAMP}$ obtained in step (6), in accordance with the following equation Eq. 32.

$$K=V_{SINAMP}/V_{COSAMP} \qquad \text{Eq. 32}$$

Step (9):

The first angle calculation means 32 calculates an approximate angle θ2 from the output $V_{SIN}$ of the output voltage detector 14, the offset value $V_{SINOFFSET}$ obtained in step (3), the output $V_{COS}$ of the output voltage detector 15, and the offset value $V_{COSOFFSET}$ obtained in step (5), in accordance with the following equation Eq. 33.

$$F(V_{sin}-V_{SINOFFSET}, (V_{cos}-V_{COSOFFSET}))=\theta 2 \qquad \text{Eq. 33}$$

Step (10):

The second angle calculation means 33 calculates an approximate angle θ3 from the function F≅θ2 obtained in step (9) and the coefficient K obtained in step (8), in accordance with the following equation Eq. 34.

$$F(V_{sin}-V_{SINOFFSET}, K(V_{cos}-V_{COSOFFSET}))=\theta 3 \qquad \text{Eq. 34}$$

Step (11):

The third angle calculation means 34 calculates an angle θ1 from the function F≅θ3 obtained in step (10) and the zero-point correction value $\theta_{SINPHASE}$ obtained in step (7), in accordance with the following equation Eq. 35.

$$F(V_{sin}-V_{SINOFFSET}, K(V_{cos}-V_{COSOFFSET}), \theta_{SINPHASE})=\theta \qquad \text{Eq. 35}$$

The above-described steps may be slightly shifted so long as computation is not hindered. Among the angle outputs θ1 to θ3, angle outputs other than θ1 are preferably output when necessary.

Through execution of the above-described steps, the angular error characteristics shown in FIGS. 4(c) and 4(d) can be attained. Thus, the angular error can be reduced greatly.

EXAMPLE 2

The offset values may be obtained through the following steps.

For the SIN voltage output coil for extracting the sine output voltage, an offset value for the sine output voltage is obtained from the deviation between an integral value of a positive output voltage and an integral value of a negative output voltage. Similarly, for the COS voltage output coil for extracting the cosine output voltage, an offset value for the cosine output voltage is obtained from the deviation between an integral value of a positive output voltage and an integral value of a negative output voltage. Subsequently, the above-described correction of offset voltages (DC components) is performed by use of these offset values.

In this case as well, the apparatus can eliminate error components from the output voltages output from the resolver, to thereby improve the accuracy of angle detection.

Obviously, numerous modifications and variations of the present invention are possible in light of the above teachings. It is therefore to be understood that within the scope of the appended claims, the present invention may be practiced otherwise than as specifically described herein.

What is claimed is:

1. An angle computation method for a VR resolver comprising:

a step a of acquiring an output voltage $V_{sin}$ of a SIN voltage output coil of the resolver and an output voltage $V_{cos}$ of a COS voltage output coil of the resolver, and extracting the maximum value $V_{sin}(max)$ of the output voltage $V_{sin}$ within a range in which the output voltage $V_{sin}$ assumes a positive value, the maximum value $V_{cos}(max)$ of the output voltage $V_{cos}$ within a range in which the output voltage $V_{cos}$ assumes a positive value, the minimum value $V_{sin}(min)$ of the output voltage $V_{sin}$ within a range in which the output voltage $V_{sin}$ assumes a negative value, the minimum value $V_{cos}(min)$ of the output voltage $V_{cos}$ within a range in which the output voltage $V_{cos}$ assumes a negative value;

a step b of obtaining an offset value $V_{SINOFFSET}$ of the output voltage $V_{sin}$ from the $V_{sin}(max)$ and the $V_{sin}(min)$ in accordance with Eq. A, and obtaining an offset value $V_{COSOFFSET}$ of the output voltage $V_{cos}$ from the $V_{cos}(max)$ and the $V_{cos}(min)$ in accordance with Eq. B; and a step c of obtaining an angle θ from the output voltage $V_{sin}$, the output voltage $V_{cos}$, the offset value $V_{SINOFFSET}$, and the offset value $V_{COSOFFSET}$ in accordance with Eq. C wherein $$V_{SINOFFSET}=(V_{sin}(max)+V_{sin}(min))/2 \quad \text{Eq. A,}$$

$$V_{COSOFFSET}=(V_{cos}(max)+V_{cos}(min))/2 \quad \text{Eq. B;}$$

$$F(V_{sin}-V_{SINOFFSET}, (V_{cos}-V_{COSOFFSET}))=0. \quad \text{Eq. C}$$

2. An angle computation method for a VR resolver according to claim 1, wherein a step d of obtaining an average amplitude $V_{SINAMP}$ of the output voltage $V_{sin}$ from the $V_{sin}(max)$ and the $V_{sin}(min)$ in accordance with Eq. D, and obtaining an average amplitude $V_{COSAMP}$ of the output voltage $V_{cos}$ from the $V_{cos}(max)$ and the $V_{cos}(min)$ in accordance with Eq. E, and a step e of obtaining a coefficient K from the average amplitude $V_{SINAMP}$ and the average amplitude $V_{COSAMP}$ in accordance with Eq. F are performed between the steps b and c; and a step f of obtaining an angle θ from the output voltage $V_{sin}$, the output voltage $V_{cos}$, the offset value $V_{SINOFFSET}$, the offset value $V_{COSOFFSET}$, and the coefficient K in accordance with Eq. G is performed in place of the step c wherein $$V_{SINAMP}=(V_{sin}(max)-V_{sin}(min))/2 \quad \text{Eq. D,}$$

$$V_{COSAMP}=(V_{cos}(max)-V_{cos}(min))/2 \quad \text{Eq. E,}$$

$$K=V_{SINAMP}/V_{COSAMP} \quad \text{Eq. F,}$$

$$F(V_{sin}-V_{SINOFFSET}, K(V_{cos}-V_{COSOFFSET}))=0. \quad \text{Eq. G}$$

3. An angle computation method for a VR resolver according to claim 2, wherein a step g of obtaining an angle $θ_{SINPHASE}$ for zero-point correction from the offset value $V_{SINOFFSET}$ and the average amplitude $V_{SINAMP}$ in accordance with Eq. H is performed before or after the step e; and a step h of obtaining an angle θ from the output voltage $V_{sin}$, the output voltage $V_{cos}$, the offset value $V_{SINOFFSET}$, the offset value $V_{COSOFFSET}$, the coefficient K, and the angle $θ_{SINPHASE}$ in accordance with Eq. I is performed in place of the step f wherein $$θ_{SINPHASE} = \sin^{-1}(V_{SINOFFSET}/V_{SINAMP}) \quad \text{Eq. H}$$
$$\cong V_{SINOFFSET}/V_{SINAMP}$$

$$F(V_{sin}-V_{SINOFFSET}, K(V_{cos}-V_{COSOFFSET}), θ_{SINPHASE})=0. \quad \text{Eq. I}$$

4. An angle computation apparatus for a VR resolver comprising:

output voltage acquiring means for acquiring an output voltage $V_{sin}$ of a SIN voltage output coil of the resolver and an output voltage $V_{cos}$ of a COS voltage output coil of the resolver;

$V_{sin}(max)$ extracting means for extracting the maximum value $V_{sin}(max)$ of the output voltage $V_{sin}$ within a range in which the output voltage $V_{sin}$ assumes a positive value;

$V_{cos}(max)$ extracting means for extracting the maximum value $V_{cos}(max)$ of the output voltage $V_{cos}$ within a range in which the output voltage $V_{cos}$ assumes a positive value;

$V_{sin}(min)$ extracting means for extracting the minimum value $V_{sin}(min)$ of the output voltage $V_{sin}$ within a range in which the output voltage $V_{sin}$ assumes a negative value;

$V_{cos}(min)$ extracting means for extracting the minimum value $V_{cos}(min)$ of the output voltage $V_{cos}$ within a range in which the output voltage $V_{cos}$ assumes a negative value;

offset value $V_{SINOFFSET}$ computation means for obtaining an offset value $V_{SINOFFSET}$ of the output voltage $V_{sin}$ from the $V_{sin}(max)$ and the $V_{sin}(min)$ in accordance with Eq. A;

offset value $V_{COSOFFSET}$ computation means for obtaining an offset value $V_{COSOFFSET}$ of the output voltage $V_{cos}$ from the $V_{cos}(max)$ and the $V_{cos}(min)$ in accordance with Eq. B; and angle computation means for obtaining an angle θ from the output voltage $V_{sin}$, the output voltage $V_{cos}$, the offset value $V_{SINOFFSET}$, and the offset value $V_{COSOFFSET}$ in accordance with Eq. C wherein $$V_{SINOFFSET}=(V_{sin}(max)+V_{sin}(min))/2 \quad \text{Eq. A,}$$

$$V_{COSOFFSET}=(V_{cos}(max)+V_{cos}(min))/2 \quad \text{Eq. B,}$$

$$F(V_{sin}-V_{SINOFFSET}, (V_{cos}-V_{COSOFFSET}))=0. \quad \text{Eq. C}$$

5. An angle computation apparatus for a VR resolver according to claim 4, wherein average amplitude $V_{SINAMP}$ computation means for obtaining an average amplitude $V_{SINAMP}$ of the output voltage $V_{sin}$ from the $V_{sin}(max)$ and the $V_{sin}(min)$ in accordance with Eq. D, average amplitude $V_{COSAMP}$ computation means for obtaining an average amplitude $V_{COSAMP}$ of the output voltage $V_{cos}$ from the $V_{cos}(max)$ and the $V_{cos}(min)$ in accordance with Eq. E, and coefficient K computation means for obtaining a coefficient K from the average amplitude $V_{SINAMP}$ output from the average amplitude $V_{SINAMP}$ computation means and the average amplitude $V_{COSAMP}$ output from the average amplitude $V_{COSAMP}$ computation means in accordance with Eq. F are provided between the offset value $V_{SINOFFSET}$ computation means and the offset value $V_{COSOFFSET}$ computation means and the angle computation means; and angle computation means for obtaining an angle θ from the output voltage $V_{sin}$, the output voltage $V_{cos}$, the offset value $V_{SINOFFSET}$, the offset value $V_{COSOFFSET}$, and the coefficient K in accordance with Eq. G is provided in place of the angle computation means of claim 4 wherein $$V_{SINAMP} = (V_{sin}(\max) - V_{sin}(\min))/2 \qquad \text{Eq. D,}$$

$$V_{COSAMP} = (V_{cos}(\max) - V_{cos}(\min))/2 \qquad \text{Eq. E;}$$

$$K = V_{SINAMP}/V_{COSAMP} \qquad \text{Eq. F}$$

$$F(V_{sin} - V_{SINOFFSET}, K(V_{cos} - V_{COSOFFSET})) = \theta. \qquad \text{Eq. G}$$

6. An angle computation apparatus for a VR resolver according to claim 5, wherein $\theta_{SINPHASE}$ computation means for obtaining an angle $\theta_{SINPHASE}$ for zero-point correction from the offset value $V_{SINOFFSET}$ and the average amplitude $V_{SINAMP}$ in accordance with Eq. H is provided; and angle computation means for obtaining an angle θ from the output voltage $V_{sin}$, the output voltage $V_{cos}$, the offset value $V_{SINOFFSET}$, the offset value $V_{COSOFFSET}$, the coefficient K, and the angle $\theta_{SINPHASE}$ in accordance with Eq. I is provided in place of the angle computation means of claim 5 wherein $$\theta_{SINPHASE} = \sin^{-1}(V_{SINOFFSET}/V_{SINAMP}) \qquad \text{Eq. H}$$

$$\cong V_{SINOFFSET}/V_{SINAMP}$$

$$F(V_{sin} - V_{SINOFFSET}, K(V_{cos} - V_{COSOFFSET}), \theta_{SINPHASE}) = \theta. \qquad \text{Eq. I}$$

* * * * *

UNITED STATES PATENT AND TRADEMARK OFFICE
CERTIFICATE OF CORRECTION

PATENT NO. : 7,187,309 B2  
APPLICATION NO. : 10/866804  
DATED : March 6, 2007  
INVENTOR(S) : Masahiro Kobayashi Page 1 of 2

It is certified that error appears in the above-identified patent and that said Letters Patent is hereby corrected as shown below:

On the Title Page, lines 22-23 Item (57):
"$F(V_{sin} - V_{SINOFFSET} \quad K(V_{cos} - V_{COSOFFSET}) \; \theta_{SINPHASE}) = \theta.$" should read
-- $F(V_{sin} - V_{SINOFFSET}, K(V_{cos} - V_{COSOFFSET}), \theta_{SINPHASE}) = \theta.$ --.

Column 17, line 40, (Claim 1): "$V_{COSOFFSET} = (V_{cos}(max) + V_{cos}(min))/2 \quad$ Eq. B;"
should read: -- $V_{COSOFFSET} = (V_{cos}(max) + V_{cos}(min))/2 \quad$ Eq. B. --.

Column 17, line 42, (Claim 1): "$F(V_{sin} - V_{SINOFFSET}(V_{cos} - V_{COSOFFSET})) = \theta.$ Eq. C"
should read: -- $F(V_{sin} - V_{SINOFFSET}(V_{cos} - V_{COSOFFSET})) = \theta \quad$ Eq. C. --.

Column 18, line 12, (Claim 2): "$\theta_{SINPHASE} = \sin^{-1}(V_{SINOFFSET}/-V_{SINAMP}) \quad$ Eq. H"
should read: -- $\theta_{SINPHASE} = \sin^{-1}(V_{SINOFFSET}/V_{SINAMP}) \quad$ Eq. H, --.

Column 18, line 17 (Claim 2): "$F(V_{sin} - V_{SINOFFSET} \quad K(V_{cos} - V_{COSOFFSET}),$"
should read: -- $F(V_{sin} - V_{SINOFFSET} \; K(V_{cos} - V_{COSOFFSET}),$ --.

Column 18, line 58, (Claim 4): "$F(V_{sin} - V_{SINOFFSET}(V_{cos} - V_{COSOFFSET})) = \theta.$ Eq. C"
should read: -- $F(V_{sin} - V_{SINOFFSET}(V_{cos} - V_{COSOFFSET})) = \theta \quad$ Eq. C. --.

Column 19, line 14, (Claim 5), "means of claim 4 wherein" should read -- means wherein --.

Column 20, line 12, (Claim 6), "means of claim 5 wherein" should read --means wherein --.

UNITED STATES PATENT AND TRADEMARK OFFICE
CERTIFICATE OF CORRECTION

PATENT NO. : 7,187,309 B2
APPLICATION NO. : 10/866804
DATED : March 6, 2007
INVENTOR(S) : Masahiro Kobayashi It is certified that error appears in the above-identified patent and that said Letters Patent is hereby corrected as shown below:

Column 20, line 19, (Claim 6): "$F(V_{sin} - V_{SINOFFSET} \quad K(V_{cos} - V_{COSOFFSET})$," should read" -- $F(V_{sin} - V_{SINOFFSET} K(V_{cos} - V_{COSOFFSET})$, --.

Signed and Sealed this

First Day of January, 2008

JON W. DUDAS
*Director of the United States Patent and Trademark Office*